No. 760,396. PATENTED MAY 17, 1904.
A. E. JOHNSTONE.
LIQUID FUEL BURNER.
APPLICATION FILED APR. 14, 1903.
NO MODEL.
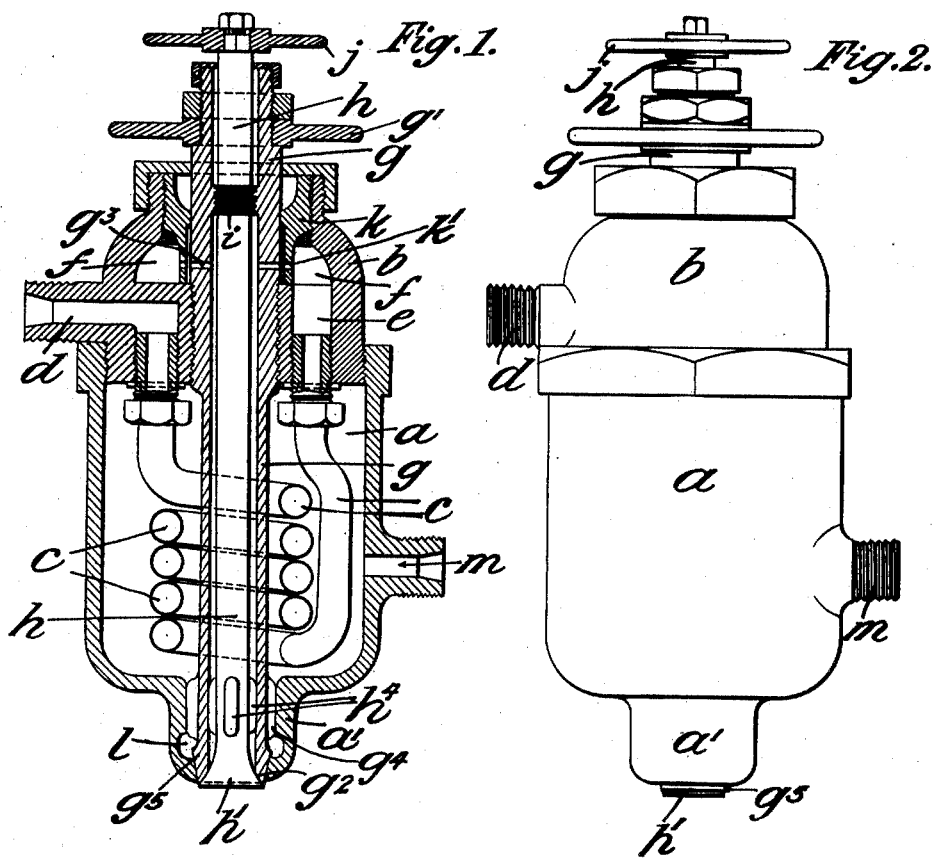
*Witnesses —*
Ellis Owen
John Smith
*INVENTOR —*
A. E. Johnstone
by W. E. Edwards
Attorney No. 760,396. Patented May 17, 1904.

UNITED STATES PATENT OFFICE.

ARTHUR ELLIOTT JOHNSTONE, OF ILFORD, ENGLAND.

LIQUID-FUEL BURNER.

SPECIFICATION forming part of Letters Patent No. 760,396, dated May 17, 1904.

Application filed April 14, 1903. Serial No. 152,529. (No model.)

*To all whom it may concern:*

Be it known that I, ARTHUR ELLIOTT JOHNSTONE, a subject of the King of England, residing at 191 High road, Ilford, in the county of Essex, England, have invented certain new and useful Improvements in and Relating to Liquid-Fuel Burners, of which the following is a specification.

This invention relates to liquid-fuel burners for use in furnaces and other situations where liquid fuel is employed.

According to the invention oil is caused to drip into a vaporizing-chamber where the vaporization is effected by steam which is conducted through the chamber by means of a coil-piping, the steam subsequently passing through to the nozzle, where it issues outwardly, inducing also the vaporized oil from the vaporizing-chamber.

The invention comprises the constructional features which are hereinafter described.

The invention is illustrated in the accompanying drawings, in which—

Figure 1 is a sectional elevation of a liquid-fuel burner provided according to the invention, and Fig. 2 is a side elevation corresponding thereto.

In carrying the invention into effect I employ a vaporizing-chamber $a$, at one end of which a cover plate or plug $b$ is provided, which is preferably screwed into the casing forming the vaporizing-chamber. This cover or plug $b$ serves to carry a coil of piping $c$, through which the steam is caused to pass as a means for vaporizing the oil that is dripped into the vaporizing-chamber.

The cover or plug $b$ aforesaid is provided with a passage $d$, through which the steam is led through the piping $c$, and another passage $e$ in a diametrically opposite position into which the steam subsequently passes after traversing the piping $c$. The latter passage $e$ communicates with an annular space $f$, provided in the cover or plug $b$, from which the steam may pass inwardly through to the nozzle, as hereinafter described.

The cover or plug $b$ carries a tubular valve-spindle $g$, which passes axially through the vaporizing-chamber $a$ and through the coil of steam-piping $c$ to the opposite end of the chamber, where it is carried by means of a boss or bearing $a'$, provided for the purpose. An operating wheel or lever $g'$ is provided upon the outwardly-projecting extremity of the hollow valve-spindle $g$ aforesaid, by means of which it may be rotated for adjustment. Within this hollow valve-spindle $g$ a second valve-spindle $h$ coaxial therewith is carried, which valve-spindle $h$ is integrally provided at its forward extremity with an outwardly-flaring part $h'$, which is capable of closure against the peripheral edge $g^2$ of the valve-spindle aforesaid for the closure or adjustment of the annular space between.

The central valve-spindle $h$ is provided with screw-threads $i$ at one part to correspond with screw-threads provided at a part of the bore of the hollow valve-spindle $g$, by means of which the longitudinal adjustment of the central valve-spindle $h$ may be effected on its rotation by such means as a wheel or lever $j$, mounted on the outwardly-projecting extremity thereof.

A sleeve $k$ may be conveniently provided to surround the hollow spindle $g$ at that part passing through the cover or plug $b$ of the vaporizing-chamber, this sleeve $k$ being provided with holes or slots $k'$, by means of which the steam may be led from the outer annular space $f$ in the cover of plug $b$ through to the annular space between the central valve-spindle $h$ and the outer valve-spindle $g$, slots or holes $g^3$ being also provided in the hollow valve-spindle for this purpose. The hollow valve-spindle $g$ and the central valve-spindle $h$ are preferably provided toward their forward extremities with projections $h^4$ $g^4$ on their circumference or other means by which they may be held centrally to allow a uniform annular space, respectively, between the central valve-spindle $h$ and the hollow valve-spindle $g$ and between the hollow valve-spindle $g$ and the boss or bearing $a'$. Furthermore, toward the forward extremity of the boss or bearing $a'$ aforesaid a continuous annular chamber $l$ is provided to surround the hollow valve-spindle aforesaid.

The extremity $g^5$ of the hollow valve-spindle $g$ may be formed slightly conical on the exterior to correspond with the formation of the forward end of the boss or bearing $a'$ aforesaid, the extremity $g^5$ thus forming a valve by means of which the supply of vapor may be completely cut off or adjusted as required.

The respective valve-spindles $h$ and $g$ aforesaid may be provided with stuffing-glands for the purpose of insuring tightness.

In operation it will be understood that the oil drips into the vaporizer onto the coil of steam-piping, and the steam is led through the coil of piping by which the oil is completely vaporized in the chamber. The steam after passing through the coil of piping passes through to the nozzle, where it issues outwardly, inducing with it the oil which has previously been completely vaporized, as described.

It will be understood that by the means hereinbefore described the steam as well as the vapor is capable of being adjusted with the greatest nicety and precision.

In fitting the burner, for example, to a furnace-door, a hole is cut out of the door one and a half inches larger than the chamber aforesaid, which is placed in the opening leading into the furnace by three inches to three and a half inches. An air-passage is formed all round the chamber, through which air to support combustion is drawn in by the action of the burner.

In setting away the burner oil or liquid fuel is admitted into the vaporizing-chamber. When it is full, the steam is turned on. The steam is used after heating the liquid in spraying the oil until the liquid is perfectly evaporated. Then the steam is shut off.

What I claim as my invention, and desire to secure by Letters Patent, is—

1. In a liquid-fuel burner, a vaporizing-chamber, a plug closing said vaporizing-chamber, an annular steam-chamber within said plug, a coil of piping within said vaporizing-chamber and carried by said plug, an inlet in said plug for steam, said inlet communicating with the coil and the opposite extremity of the coil communicating with the annular steam-chamber, means for admitting oil to said vaporizing-chamber, an opening at the extremity of the vaporizing-chamber opposite to that in which the plug is carried, and a valve for controlling the passage of oil from the said vaporizing-chamber, and a valve controlling the passage of steam therethrough, and means for conveying the steam to the outlet from the vaporizing-chamber substantially as described.

2. In a liquid-fuel burner, a vaporizing-chamber, a plug closing said vaporizing-chamber, an annular steam-chamber within said plug, a coil of piping within said vaporizing-chamber and carried by said plug, an inlet in said plug for steam, said inlet communicating with the coil and the opposite extremity of the coil communicating with the annular steam-chamber, means for admitting oil to said vaporizing-chamber, an opening at the extremity of the vaporizing-chamber opposite to that in which the plug is carried, a hollow spindle carried by said plug, whose opposite extremity is formed to close the said opening from the vaporizing-chamber, and holes transversely provided within said hollow spindle through which steam passes from the annular steam-chamber aforesaid, a central valve-spindle arranged within the hollow spindle having its extremity formed as a valve to control the passage of steam from the annular space between the central valve-spindle and the hollow spindle aforesaid, substantially as described.

3. In a liquid-fuel burner, a vaporizing-chamber, a plug closing said vaporizing-chamber, an annular steam-chamber within said plug, a coil of piping within said vaporizing-chamber and carried by said plug, an inlet in said plug for steam, said inlet communicating with the coil and the opposite extremity of the coil communicating with the annular steam-chamber, means for admitting oil to said vaporizing-chamber, an opening at the extremity of the vaporizing-chamber opposite to that in which the plug is carried, a hollow spindle carried by said plug, whose opposite extremity is formed to close the said opening from the vaporizing-chamber, holes transversely provided within said hollow spindle through which steam passes from the annular steam-chamber aforesaid, a central valve-spindle arranged within the hollow spindle having its extremity formed as a valve to control the passage of steam from the annular space between the central valve-spindle and the hollow spindle aforesaid, a sleeve surrounding the hollow spindle at a part adjacent to the annular steam-space aforesaid, said sleeve being screwed within the plug and carrying holes through which steam passes through to the hollow spindle substantially as described.

In testimony whereof I have signed my name to this specification in the presence of two subscribing witnesses.

ARTHUR ELLIOTT JOHNSTONE.

Witnesses:
CHARLES ABBOTT,
GEORGE RAY.